(12) United States Patent
Benoit et al.

(10) Patent No.: US 6,397,595 B2
(45) Date of Patent: Jun. 4, 2002

(54) PYROTECHNIC ACTUATOR WITH A DEFORMABLE MEMBRANE

(75) Inventors: Emmanuel Benoit, Paris; Jean-François Beau, St Ouen l'Aumone; Erwan Le Floch, Chatou, all of (FR)

(73) Assignee: Eads Launch Vehicle, Paris (FR)

( * ) Notice: Subject to any disclaimer, the term of this patent is extended or adjusted under 35 U.S.C. 154(b) by 0 days.

(21) Appl. No.: 09/858,572

(22) Filed: May 17, 2001

(30) Foreign Application Priority Data

May 29, 2000 (FR) .............................. 00 06827

(51) Int. Cl.[7] .............................................. F01B 29/00
(52) U.S. Cl. ............................. 60/512; 60/508; 137/67
(58) Field of Search .................... 60/508, 512; 137/67, 137/68.1

(56) References Cited

U.S. PATENT DOCUMENTS

| 3,106,131 A | | 10/1963 | Barr et al. | |
| 3,315,748 A | | 4/1967 | Merdinyan et al. | |
| 4,091,621 A | * | 5/1978 | Patrichi | 60/635 |
| 4,111,221 A | | 9/1978 | Olsen | |
| 4,619,284 A | * | 10/1986 | Delarue et al. | 137/67 |
| 5,489,072 A | * | 2/1996 | Gordon et al. | 242/374 |
| 6,106,008 A | * | 8/2000 | Clackshire et al. | 280/737 |

FOREIGN PATENT DOCUMENTS

| FR | 2 561 743 | 9/1985 |
| RU | 1 721 360 | 3/1992 |

* cited by examiner

Primary Examiner—Hoang Nguyen
(74) Attorney, Agent, or Firm—Oblon, Spivak, McClelland, Maier & Neustadt, P.C.

(57) ABSTRACT

A pyrotechnic actuator comprises a deformable membrane (24) separating a first chamber (20), which is able to receive pyrotechnic combustion gases, from a second chamber (22) containing a control member (32) displaceable by the membrane (24) during the operation of the actuator. In the inoperative state, the membrane (24) is prestressed counter to its deformation controlled by the intake of gases into the first chamber (20). In this way the functional travel is increased, which e.g. makes it possible to open or close a circuit with a larger cross-section without increasing the actuator size.

5 Claims, 1 Drawing Sheet

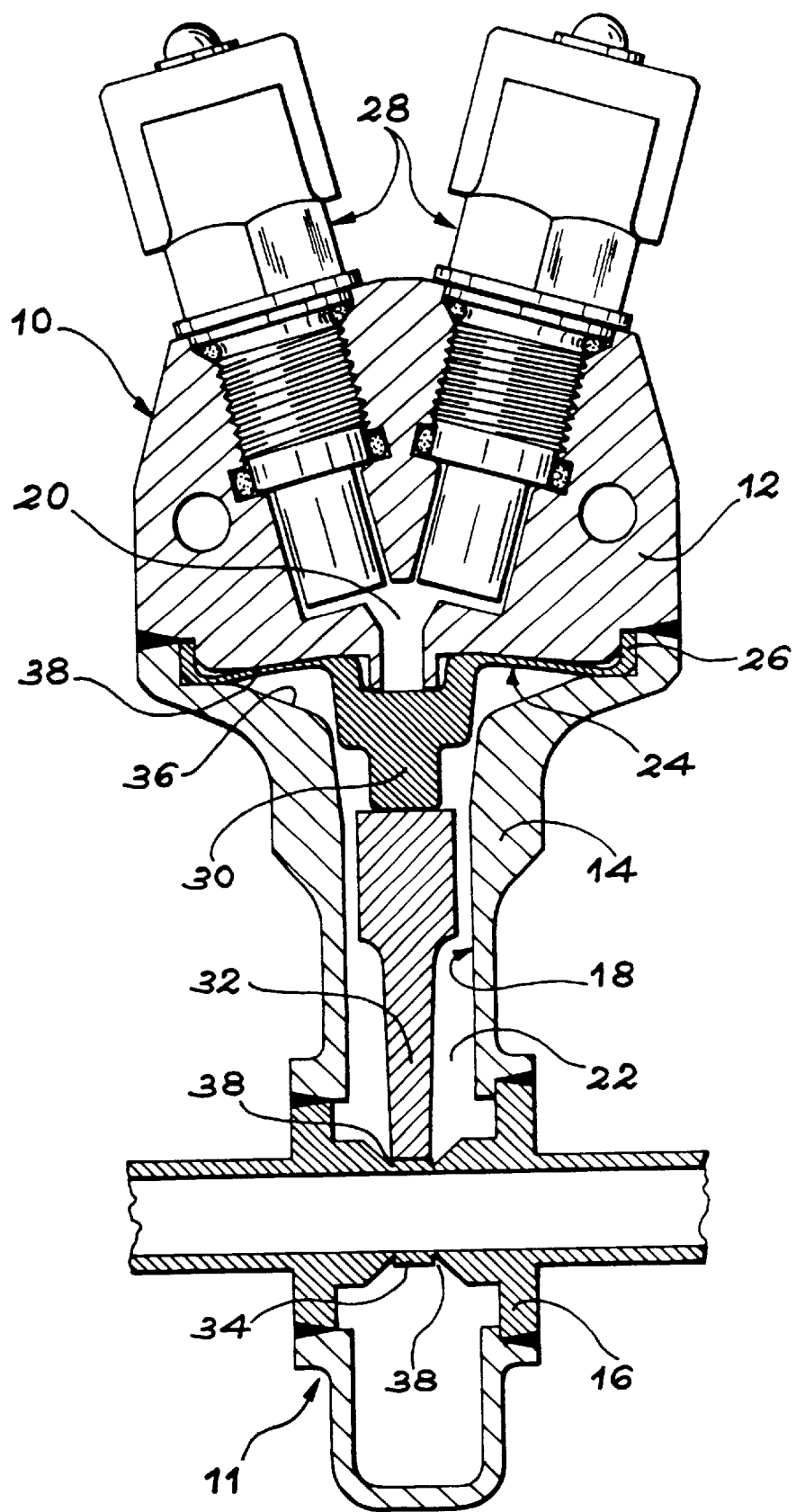

PYROTECHNIC ACTUATOR WITH A DEFORMABLE MEMBRANE

DESCRIPTION

1. Technical Field

The invention relates to a pyrotechnic actuator with a deformable membrane, i.e. a device able to actuate an external member, such as a valve or a jack, under the action of gases under high pressure produced by pyrotechnic means and acting on a deformable membrane.

The pyrotechnic actuator according to the invention can be used in numerous fields and in particular in the aeronautical and space industries for actuating members of different types such as valves, jacks, etc.

2. Prior Art

As is more particularly illustrated by FR-A-2 561 743, a pyrotechnic actuator conventionally comprises a body internally defining a cavity in which is placed a deformable membrane. More specifically, the deformable membrane subdivides the cavity into two chambers which are tight with respect to one another. A first of these chambers communicates with the pyrotechnic means in such a way that the operation of said means has the effect of filling said first chamber with pyrotechnic combustion gases under high pressure. The second chamber contains an actuating member. The deformation of the membrane brought about by the admission of combustion gases into the first chamber has the effect of displacing the actuating member on moving away from the first chamber. In FR-A-2 561 743, which describes a pyrotechnic actuator applied to the actuation of a valve, the effect of this displacement is to break apart bringing about the opening or closing of a tube integrated into the actuator body and forming part of a fluid circuit.

In a pyrotechnic actuator of this type, the membrane is inoperative in a non-prestressed state, which generally gives it an essentially planar shape. When the pyrotechnic combustion gases are admitted into the first chamber, the membrane deforms in the direction of the second chamber. To ensure sealing between the pyrotechnic combustion gases admitted into the first chamber and the fluid of the circuit, it is necessary to maintain the integrity of the membrane. Thus, the deformation of the membrane must take place on a limited functional path. To this end, a bearing surface is provided in the second chamber, so as to limit the deformation of the membrane within said second chamber.

This feature, more particularly described in FR-A-2 561 743, leads to the limitation of the functional travel of the actuating member placed in the second chamber. However, it is this functional travel which determines and limits the action of the actuating member. Thus, in the example described where the actuator is used for controlling a valve, the functional travel of the actuating member defines the dimensions of the part, which must be broken by the control member during the operation of the actuator. For an actuator of given dimensions, this leads to a limitation in the diameter of the tube in which the fluid circulates within the valve.

In order to obviate this disadvantage, it is possible to consider increasing the functional travel by increasing the membrane diameter. However, this very rapidly leads to giving the actuator large dimensions and a high weight. This is generally unacceptable, particularly in the most current applications of such actuators, namely the aeronautical and space industries.

SU-A-1 721 360 discloses a pyrotechnic actuator with a deformable membrane in which the membrane has, in the inoperative state, an undulating shape obtained by the compression of said membrane between a perforated disk, placed in a first chamber and provided for receiving the pyrotechnic combustion gases, and an actuating member placed in the second chamber. Said actuating member then bears, by means of damping elements, on a wall of the second chamber positioned facing the membrane. When the pyrotechnic means are actuated, the combustion gases penetrate the first chamber and drive back the actuating member against the aforementioned wall of the second chamber, whilst deforming the damping elements. At the end of its travel, the actuating member acts on a sealing device and destroys a bursting disk by which said device was initially linked with the actuator body. A spring then displaces the sealing device released in this way, which has the effect of opening a fluid circuit.

Said actuator is designed to limit the effects of impact during the operation of the pyrotechnic means in such a way as to increase the reliability thereof.

This result is obtained by limiting the functional travel for controlling the opening of the fluid circuit, which is in opposition to the aim of the present invention.

DESCRIPTION OF THE INVENTION

The invention specifically relates to a pyrotechnic actuator having a deformable membrane, whose original design makes it able to double the functional travel of the actuating member and therefore the diameter of the tube in which the fluid circulates when said member controls the opening or closing of a valve, but without increasing the size and weight of the actuator.

According to the invention this result is obtained by means of a pyrotechnic actuator comprising a body internally defining a cavity, a deformable membrane tightly subdividing said cavity into two chambers, a first of said chambers being able to receive pyrotechnic combustion gases in order to bring the membrane into an actuating position determined by a bearing surface limiting the deformation of the membrane within the second chamber, said second chamber containing a control member displaceable by said membrane over a distance corresponding to an actuating travel of said actuator when the combustion gases are admitted into the first chamber, characterized in that said membrane occupies in the inoperative state a prestressed position on moving away from the bearing surface.

In the invention defined in this way, due to the fact that the membrane occupies a prestressed position on moving away from the bearing surface when the actuator is inoperative, the operation of the actuator has the effect of deforming the membrane over a distance which is increased compared with the deformation of the membrane of a prior art pyrotechnic actuator, but without said deformation being prejudicial to the sealing of said membrane. This brings about a significant increase in the displacement of the member actuatable by the actuator and e.g. the size of a tube which can be severed by the actuator, but without increasing the size and weight thereof.

In a preferred embodiment of the invention, the prestressed position of the membrane is substantially symmetrical with respect to its actuating position. The functional travel is then doubled compared with a prior art pyrotechnic actuator.

Preferably, the prestressed position of the membrane is defined by its maintenance in abutment against the control member, normally bearing against a part able to break or move when the combustion gases are admitted into the first chamber.

Advantageously, said part is an integral portion of a fluid circuit, so that its breaking has the effect of changing the state of said circuit, i.e. either the opening or closing thereof.

Preferably, the membrane is planar when in its non-prestressed state.

BRIEF DESCRIPTION OF THE DRAWING

The invention is described in greater detail hereinafter relative to a preferred embodiment and with reference to the attached drawing, which is a longitudinal sectional view of a pyrotechnic actuator according to the invention.

DETAILED DESCRIPTION OF A PREFERRED EMBODIMENT

In the single drawing, reference numeral 10 designates in general terms the body of a pyrotechnic actuator according to the invention. In the embodiment illustrated in a non-limitative manner here, the actuator controls the opening of a valve 11 integrated into the body 10. The body 10 is here, in exemplified manner, formed by three pieces 12, 14 and 16 assembled with one another by welding.

The body 10 internally defines a cavity 18, which is subdivided into two chambers 20, 22 by a deformable membrane 24. In the embodiment shown, the deformable membrane 24 is in the form of a planar disk when in its non-prestressed state. It comprises an external, peripheral edge 26, tightly trapped between the pieces 12 and 14 of the valve body 10. Consequently the deformable membrane 24 tightly separates the chambers 20 and 22.

It should be noted that in the inoperative state the membrane 24 may have a non-planar, e.g. undulating shape, without passing beyond the scope of the invention.

The first chamber 20, formed integrally in the piece 12 of body 10, is able to collect pyrotechnic combustion gases produced by one or more pyrotechnic devices, such as the two devices 28 illustrated in non-limitative manner in the drawing. The pyrotechnic device or devices 28 can be fitted directly in the piece 12, in the manner shown in the drawing, or can be placed outside the body 10 and connected thereto by a tube communicating with the chamber 20. Each pyrotechnic device 28 can be constituted by any known device able to suddenly produce a large quantity of combustion gas under high pressure within the chamber 20. Therefore no description thereof will be given.

In its part adjacent to the membrane 24, the first chamber 20 forms a reduced diameter neck centred on the axis of the membrane 24. This neck makes it possible to expand the combustion gases when they come into contact with the membrane.

In its central portion located on the side of the second chamber 22, the deformable membrane 24 has a solid, cylindrical portion 30 projecting into chamber 22.

A control member 32, here in the form of a plunger, is housed in a substantially tubular portion of the second chamber 22. More specifically, a first end of the control member 32 bears against the end face of the solid, cylindrical portion 30 and the opposite end of the control member 32 bears against a central portion 34 of the third piece 16 of body 10.

According to the invention and as illustrated in the drawing, the arrangement described hereinbefore is such that the membrane 24 occupies in the inoperative state a prestressed position moving away from a bearing surface 36 provided in the second chamber 22 facing the membrane 24. More specifically, the prestressed position occupied in the inoperative state by the membrane 24 is such that the latter is in the vicinity of a surface 32 formed on the first piece 12 of body 10, in the first chamber 20, facing the membrane 24.

In the preferred embodiment of the invention illustrated in the single drawing, the prestressed position of the membrane 24 is substantially symmetrical to an actuating position of said membrane. The actuating position of the membrane is obtained when the combustion gases are admitted into the first chamber 20, i.e. when the membrane 24 abuts against the bearing surface 36.

In the embodiment shown in exemplified manner in the drawing, the third piece 16 of the body 10 is a tubular piece forming part of a fluid circuit and whereof it is wished to be able to interrupt the flow by an actuation of the valve 11 controlled by the actuator 10. The piece 16 traverses two opposite walls of the second piece 14 as well as the second chamber 22, in a portion of the latter located beyond the end of the control member 32. In addition, the third piece 16 is tightly welded to the two opposite walls so as to maintain the confinement of the chamber 22.

The central portion 34 of piece 16 against which bears the control member 32 is designed so as to be able to break by shearing when the control member 32 is downwardly displaced in the drawing as a result of the admission of combustion gases into the first chamber 20. To this end the central portion 34 of the third piece 16 is connected to adjacent portions thereof by reduced thickness sections 38.

The operation of the pyrotechnic actuator according to the invention will now be described relative to the single drawing.

In the inoperative state, the membrane 24 is prestressed on moving away from the bearing surface 36. As described hereinbefore, this prestressing action is obtained under the effect of the control member 32, whose opposite ends respectively bear against the solid, cylindrical portion 30 integral with the membrane 24 and against the central portion 34 of piece 16.

When the pyrotechnic device or devices 28 are operated, combustion gas is suddenly injected in a large quantity and under high pressure into the first chamber 20. Under the effect of this sudden pressure increase in the chamber 20, the membrane 24 deforms towards the bearing surface 36 driving back in the same direction the solid, cylindrical portion 30 and the control member 32. This has the effect of separating, by shearing, the central portion 34 from the third piece 16 from adjacent portions thereof. The portion of the control member 32 closest to the third piece 16 then penetrates between the adjacent portions thereof in order to take the place of the central portion 34. Therefore the fluid circuit passing through the third piece 16 is immediately closed.

In the pyrotechnic actuator according to the invention, the prestress initially imposed on the membrane 24 enables it, as well as the solid, cylindrical portion 30 and the control member 32, to have an increased displacement distance. Thus, the membrane 34 is then displaced between its prestressed position moving away from the bearing surface 36 and its actuating position bearing against the bearing surface 36. The actuator 10 is designed in such a way that the displacement distance of the member 24 corresponds to the actuating travel of the valve 11. In other words, the displacement of the membrane 24 is equal to the travel necessary for the opening or closing of the valve 11 (as a function of the valve type in question).

Therefore the functional travel is substantially doubled compared with that of a prior art pyrotechnic actuator having a membrane 24 with the same diameter. Thus, it is e.g.

possible without increasing the overall dimensions and weight of the actuator, to seal a circuit having a diameter substantially double that which could be sealed by a prior art actuator.

Obviously, the invention is not limited to the pyrotechnic actuator specifically described with reference to the single drawing. Thus, it is clear that the membrane prestressing characteristics can also be advantageously used for controlling the opening of a fluid circuit, a jack, or any other member of this type whilst using the knowledge of the expert (cf. e.g. the embodiment of FIGS. 3 and 4 of FR-A-2 561 743).

What is claimed is:

1. Pyrotechnic actuator comprising a body internally defining a cavity, a deformable membrane tightly subdividing said cavity into two chambers, a first of said chambers being able to receive pyrotechnic combustion gases in order to bring the membrane into an actuating position determined by a bearing surface limiting the deformation of the membrane within the second chamber, said second chamber containing a control member displaceable by said membrane over a distance corresponding to an actuating travel of said actuator, when the combustion gases are admitted into the first chamber, wherein said membrane, in the inoperative state, occupies a prestressed position moving away from the bearing surface.

2. Pyrotechnic actuator according to claim 1, wherein the prestressed position of the membrane is substantially symmetrical with respect to its actuating position.

3. Pyrotechnic actuator according to claim 1, wherein the prestressed position of the membrane is defined by its maintenance in abutment against said control member, normally bearing against a part able to break or move when combustion gases are admitted into the first chamber.

4. Pyrotechnic actuator according to claim 3, wherein said part forms an integral part of a fluid circuit, so that its breaking leads to a change of state of said circuit.

5. Pyrotechnic actuator according to claim 1, wherein the membrane is planar in a non-prestressed state.

* * * * *